(12) United States Patent
Liu et al.

(10) Patent No.: US 10,180,760 B2
(45) Date of Patent: Jan. 15, 2019

(54) METHOD AND DEVICE FOR DRIVING TOUCH DISPLAY PANEL WITH MULTIPLE DISPLAY TIME PERIODS AND MULTIPLE TOUCH TIME PERIODS IN TIME PERIOD FOR DISPLAYING EACH IMAGE FRAME, AND TOUCH DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Bo Liu, Beijing (CN); Xianjie Shao, Beijing (CN); Qinghua Jiang, Beijing (CN); Honggang Gu, Beijing (CN); Xiaojie Zhang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

(*) Notice: Subject to any disclaimer, the term of this patent is extended or adjusted under 35 U.S.C. 154(b) by 20 days.

(21) Appl. No.: 15/167,637

(22) Filed: May 27, 2016

(65) Prior Publication Data
US 2017/0045968 A1   Feb. 16, 2017

(30) Foreign Application Priority Data
Aug. 10, 2015  (CN) .......................... 2015 1 0486240

(51) Int. Cl.
*G06F 3/044*   (2006.01)
*G06F 3/041*   (2006.01)

(52) U.S. Cl.
CPC ............ *G06F 3/044* (2013.01); *G06F 3/0412* (2013.01)

(58) Field of Classification Search
CPC ............................. G06F 3/044; G06F 3/0412
See application file for complete search history.

(56) References Cited

U.S. PATENT DOCUMENTS

2013/0215049 A1   8/2013   Lee
2013/0314361 A1*  11/2013  Saitoh .................. G06F 3/0412
                                                         345/173
(Continued)

FOREIGN PATENT DOCUMENTS

CN   103257740 A    8/2013
CN   203178995 U    9/2013
(Continued)

OTHER PUBLICATIONS

First Office Action for Chinese Application No. 201510486240.1, dated Jul. 17, 2017, 7 Pages.

*Primary Examiner* — Kwang-Su Yang
(74) *Attorney, Agent, or Firm* — Brooks Kushman P.C.

(57) ABSTRACT

The present disclosure provides a method and a device for driving a touch display panel, and a touch display device. The touch display panel includes L gate lines and M touch scanning lines, where L and M are each a positive integer greater than 1. The method includes steps of: dividing a time period for displaying each image frame of the touch display panel into N control time periods, each of the N control time periods including a display time period and a touch time period, N being an even number equal to or greater than 2; and driving the L gate lines within the N display time periods and driving the M touch scanning lines in each touch time period in the time period for displaying each image frame of the touch display panel.

15 Claims, 3 Drawing Sheets

(56) References Cited

U.S. PATENT DOCUMENTS

| | | | |
|---|---|---|---|
| 2014/0340600 A1* | 11/2014 | Yokonuma | G09G 3/3614 349/33 |
| 2015/0009166 A1* | 1/2015 | Saitoh | G06F 3/0412 345/173 |
| 2015/0103068 A1 | 4/2015 | Kim et al. | |
| 2015/0185914 A1* | 7/2015 | Han | G06F 3/044 345/174 |

FOREIGN PATENT DOCUMENTS

| | | |
|---|---|---|
| CN | 104216561 A | 12/2014 |
| CN | 104570427 A | 4/2015 |
| CN | 104750330 A | 7/2015 |

\* cited by examiner

METHOD AND DEVICE FOR DRIVING TOUCH DISPLAY PANEL WITH MULTIPLE DISPLAY TIME PERIODS AND MULTIPLE TOUCH TIME PERIODS IN TIME PERIOD FOR DISPLAYING EACH IMAGE FRAME, AND TOUCH DISPLAY DEVICE

CROSS-REFERENCE TO RELATED APPLICATION

The present application claims a priority of the Chinese patent application No. 201510486240.1 filed on Aug. 10, 2015, which is incorporated herein by reference in its entirety.

TECHNICAL FIELD

The present disclosure relates to the field of touch display technology, in particular to a method and a device for driving a touch display panel, and a touch display device.

BACKGROUND

For an in-cell capacitive touch display device, a touch function is integrated into each pixel, so a touch electrode of a capacitive touch panel is spaced apart from a liquid crystal layer at a micrometer level. As a result, an electric field generated during the operation of the capacitive touch panel may easily interfere with the rotation of liquid crystal molecules and the coupling of the touch electrode and a pixel electrode, and the pixel electrode may be charged disorderly, so an image may be displayed abnormally (similarly, an electric field generated during operation of a liquid crystal panel may also interfere with an electric field of the touch electrode and may be coupled to the touch electrode). Hence, in the in-cell capacitive touch device, a display operation and a touch operation need to be performed in a time-division manner.

In the related art, in the case that a touch display panel includes L gate lines and M touch scanning lines (L and M are each a positive integer greater than 1), a method for driving the touch display panel includes reserving a blank time period in a time period for displaying each image frame by the touch display panel, so as to perform a touch scanning operation on the M touch scanning lines within this blank time period, as shown in FIG. 1. In other words, the time period T for displaying each image frame is divided into a display time period T1 in which the L gate lines are driven and a touch time period T2 in which the M touch scanning lines are driven. However, the time period for the touch scanning is limited within the time period for display each image frame, so the sensitivity and the report rate are relatively low, and the touch performance of the touch display panel will be adversely affected.

SUMMARY

A main object of the present disclosure is to provide a method and a device for driving a touch display panel, and a touch display device, so as to solve problems of low sensitivity and low report rate caused by limited time period for touching and scanning in the time period for displaying one image frame, thereby to improve the touch performance of the touch display panel.

In one aspect, the present disclosure provides in some embodiments a method for driving a touch display panel. The touch display panel includes L gate lines and M touch scanning lines, where L and M are each a positive integer greater than 1. The method includes steps of: dividing a time period for displaying each image frame of the touch display panel into N control time periods, wherein each of the N control time periods includes a display time period and a touch time period, N is an even number equal to or greater than 2; and driving the L gate lines within the N display time periods and driving the M touch scanning lines in each touch time period in the time period for displaying each image frame of the touch display panel.

Alternatively, the step of driving the L gate lines within the N display time periods includes: driving the odd-numbered gate lines sequentially in the odd-numbered display time periods and driving the even-numbered gate lines sequentially in the even-numbered display time periods, or driving the even-numbered gate lines sequentially in the odd-numbered display time periods and driving the odd-numbered gate lines sequentially in the even-numbered display time periods. In the time period for displaying each image frame of the touch display panel, a data voltage applied to each data line within each odd-numbered display time period has a polarity opposite to a polarity of a data voltage applied to the data line within each even-numbered display time period.

Alternatively, the polarities of the data voltages applied to the data lines are not changed within an identical display time period, and the data voltages applied to the two adjacent data lines within the display time period have polarities opposite to each other. The data voltages applied to each data line within the display time periods for the adjacent image frames have polarities opposite to each other.

Alternatively, N is equal to 2.

In another aspect, the present disclosure provides in some embodiments a device for driving a touch display panel. The touch display panel includes L gate lines and M touch scanning lines, where L and M are each a positive integer greater than 1. The device includes: a clock unit configured to divide a time period for displaying each image frame of the touch display panel into N control time periods, wherein each of the N control time periods includes a display time period and a touch time period, N is an even number equal to or greater than 2; a display control unit configured to drive the L gate lines within the N display time periods in the time period for displaying each image frame of the touch display panel; and a touch control unit configured to drive the M touch scanning lines within each touch time period in the time period for displaying each image frame of the touch display panel.

Alternatively, the display control unit is further configured to, in the time period for displaying each image frame of the touch display panel, drive the odd-numbered gate lines sequentially within the odd-numbered display time periods and drive the even-numbered gate lines sequentially within the even-numbered display time periods, or drive the even-numbered gate lines sequentially within the odd-numbered display time periods and drive the odd-numbered gate lines sequentially within the even-numbered display time periods. In the time period for displaying each image frame of the touch display panel, a data voltage applied to each data line within each odd-numbered display time period has a polarity opposite to a data voltage applied to each data line within each even-numbered display time period.

Alternatively, the polarities of the data voltages applied to the data lines are not changed within an identical display time period, and the data voltages applied to the two adjacent data lines within the identical display time period have polarities opposite to each other. The data voltages applied to each data line within the display time periods for the adjacent image frames have polarities opposite to each other.

Alternatively, N is equal to 2.

In yet another aspect, the present disclosure provides in some embodiments a touch display device including a touch display panel and the above-mentioned device for driving the touch display panel.

According to the method and device for driving the touch display panel and the touch display device in the embodiments of the present disclosure, the time period for displaying each image frame of the touch display panel includes N touch time periods, and all the touch scanning lines are driven in each touch time period. As a result, it is able to increase the report rate and the sensitivity, thereby to improve the performance of the touch display panel.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments a method for driving a touch display panel. The touch display panel includes L gate lines and M touch scanning lines, where L and M are each a positive integer greater than 1. The method includes steps of: dividing a time period for displaying each image frame by the touch display panel into N control time periods, wherein each of the N control time periods includes a display time period and a touch time period, N is an even number equal to or greater than 2; and in the time period for displaying each image frame by the touch display panel, driving the L gate lines within the N display time periods and driving the M touch scanning lines in each touch time period.

According to the method for driving the touch display panel in the at least one embodiment of the present disclosure, the time period for displaying each image frame includes N touch time periods, and all the touch scanning lines are driven in each touch time period. As a result, it is able to increase the report rate and the sensitivity, thereby to improve the performance of the touch display panel.

Figure 1:
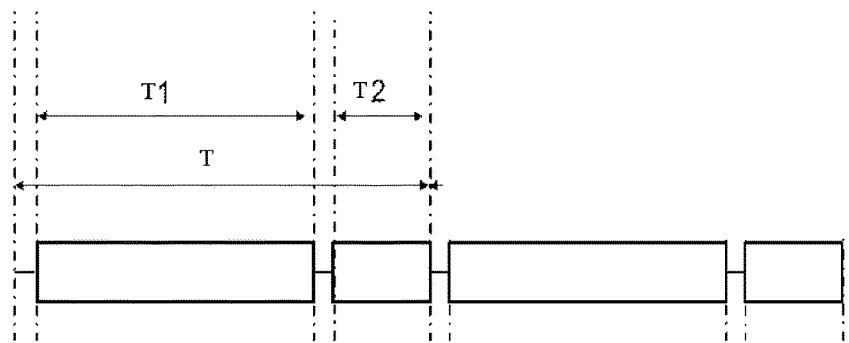
FIG. 1 is a sequence diagram of a method for driving a touch display panel in the related art.
Figure 2:
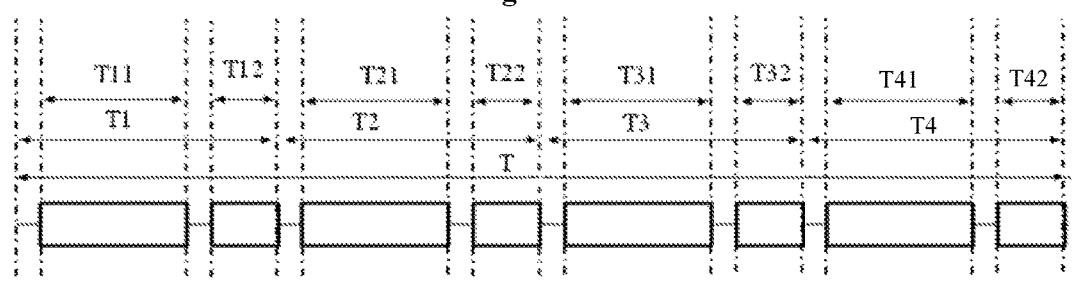
FIG. 2 is a sequence diagram of a method for driving a touch display panel according to at least one embodiment of the present disclosure.

For example, as shown in FIG. 2, the time period T for displaying each image frame is divided into a first control time period T1, a second control time period T2, a third control time period T3, and a fourth control time period T4. The first control time period T1 includes a first display time period T11 and a first touch time period T12, the second control time period T2 includes a second display time period T21 and a second touch time period T22, the third control time period T3 includes a third display time period T31 and a third touch time period T32, and the fourth control time period T4 includes a fourth display time period T41 and a fourth touch time period T42. The L gate lines are sequentially scanned within the first display time period T11, the second display time period T21, the third display time period T31, and the fourth display time period T41, and the M touch scanning lines are sequentially scanned within each of the first touch time period T12, the second touch time period T22, the third touch time period T32, and the fourth touch time period T42.

In this way, it is able to perform the touch scanning operation for four times within the four touch time periods within one image frame, so as to increase the report rate and the sensitivity, thereby to improve the performance of the touch display panel.

In an alternative embodiment of the present disclosure, the step of driving the L gate lines within the N display time periods includes driving the odd-numbered gate lines sequentially in the odd-numbered display time periods and driving the even-numbered gate lines sequentially in the even-numbered display time periods, or driving the even-numbered gate lines sequentially in the odd-numbered display time periods and driving the odd-numbered gate lines sequentially in the even-numbered display time periods. In the time period for displaying each image frame by the touch display panel, a data voltage applied to each data line within each odd-numbered display time period has a polarity opposite to a data voltage applied to each data line within each even-numbered display time period.

In this way, the polarities of the data voltages applied to pixels in a row may be opposite to the polarities of the data voltages applied to pixels in an adjacent row respectively by merely changing the polarities of the data voltages applied to the data lines once every two display time periods.

Alternatively, the step of driving the L gate lines within the N display time periods includes driving the odd-numbered gate lines sequentially in the odd-numbered display time periods and driving the even-numbered gate lines sequentially in the even-numbered display time periods, or driving the even-numbered gate lines sequentially in the odd-numbered display time periods and driving the odd-numbered gate lines sequentially in the even-numbered display time periods. In the time period for displaying each image frame by the touch display panel, a data voltage applied to each data line within each odd-numbered display time period has a polarity opposite to a polarity of a data voltage applied to each data line within each even-numbered display time period. The data voltages applied to each data line within the display time periods for the two adjacent image frames have polarities opposite to each other.

In this way, it is able to provide an inversion driving mode between a dot inversion mode and a column inversion mode, so as to achieve a display effect of the dot inversion mode within every two control time periods and reduce the times for inverting the polarities of the data voltages applied to the data lines. In other words, it is able to achieve the display effect of the dot inversion mode by merely changing the polarities of the data voltages applied to the data lines once within every two display time periods.

Alternatively, N is equal to 2, and the step of driving the L gate lines within the N display time periods includes driving the gate lines in odd-numbered rows sequentially within the first display time period and driving the gate lines in even-numbered rows sequentially within the second display time period, or driving the gate lines in the even-numbered rows sequentially within the first display time period and driving the gate lines in the odd-numbered rows sequentially within the second display time period.

In the time period for displaying each image frame by the touch display panel, the polarity of the data voltage applied to each data line within the first display time period is opposite to the polarity of the data voltage applied to each data line within the second display time period.

The polarities of the data voltages applied to the data lines are not changed within an identical display time period, the data voltage applied to each data line within the display time periods for an image frames has a polarity opposite to a polarity of the data voltage applied to the data line within the display time periods for an adjacent image frames, and the data voltages applied to the two adjacent data lines within an identical display time period have polarities opposite to each other.

In this way, it is able to provide an inversion driving mode between a dot inversion mode and a column inversion mode, so as to achieve a display effect of the dot inversion within the time period for displaying one image frame and reduce the times for inverting the polarities of the data voltages applied to the data lines. In other words, it is able to achieve the display effect of the dot inversion by merely changing the polarities of the data voltages applied to the data lines once within the time period for displaying one image frame.

Figure 3:
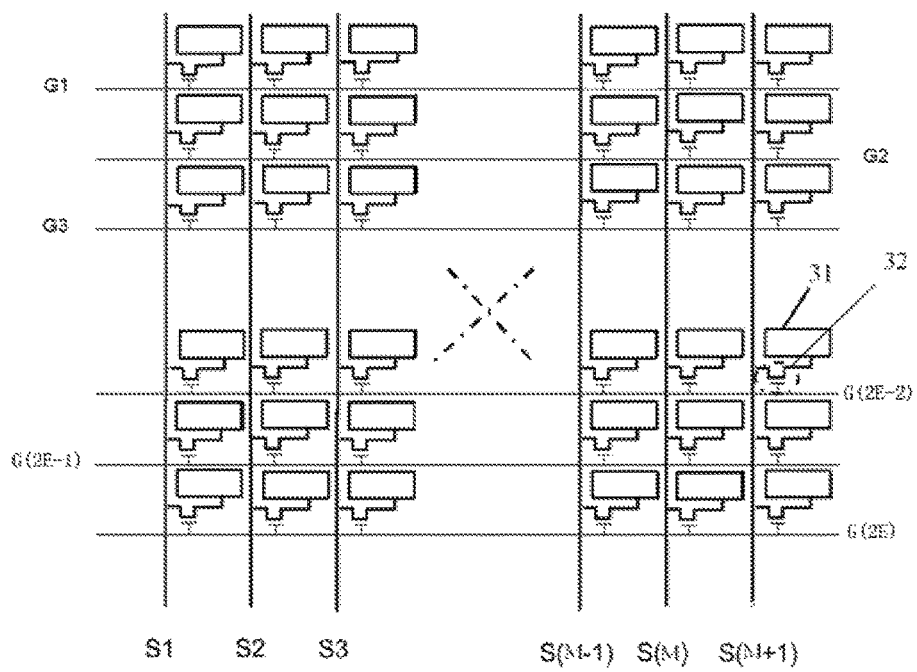
FIG. 3 is a schematic view showing a driver circuit included in the touch display panel according to at least one embodiment of the present disclosure.

As shown in FIG. 3, the touch display panel includes 2E gate lines and M+1 data lines, where E and M are both positive integers.

In FIG. 3, reference signs G1, G2, G3, G(2E−1), G(2E−2) and G(2E) represent a first gate line, a second gate line, a third gate line, a $(2E-1)^{th}$ gate line, a $(2E-2)^{th}$ gate line and a $(2E)^{th}$ gate line respectively, and reference signs S1, S2, S3, S(M−1), S(M) and S(M+1) represent a first data line, a second data line, a third data line, an $(M-1)^{th}$ data line, an $M^{th}$ data line and an $(M+1)^{th}$ data line.

A gate driver circuit for driving the touch display panel includes 2E*(M+1) pixel units, and each pixel unit includes a pixel electrode 31 and a thin film transistor (TFT) 32. The pixel electrode 31 is connected to the corresponding data line via the corresponding TFT 32, and a gate electrode of the TFT 32 is connected to the corresponding gate line.

Figure 4:
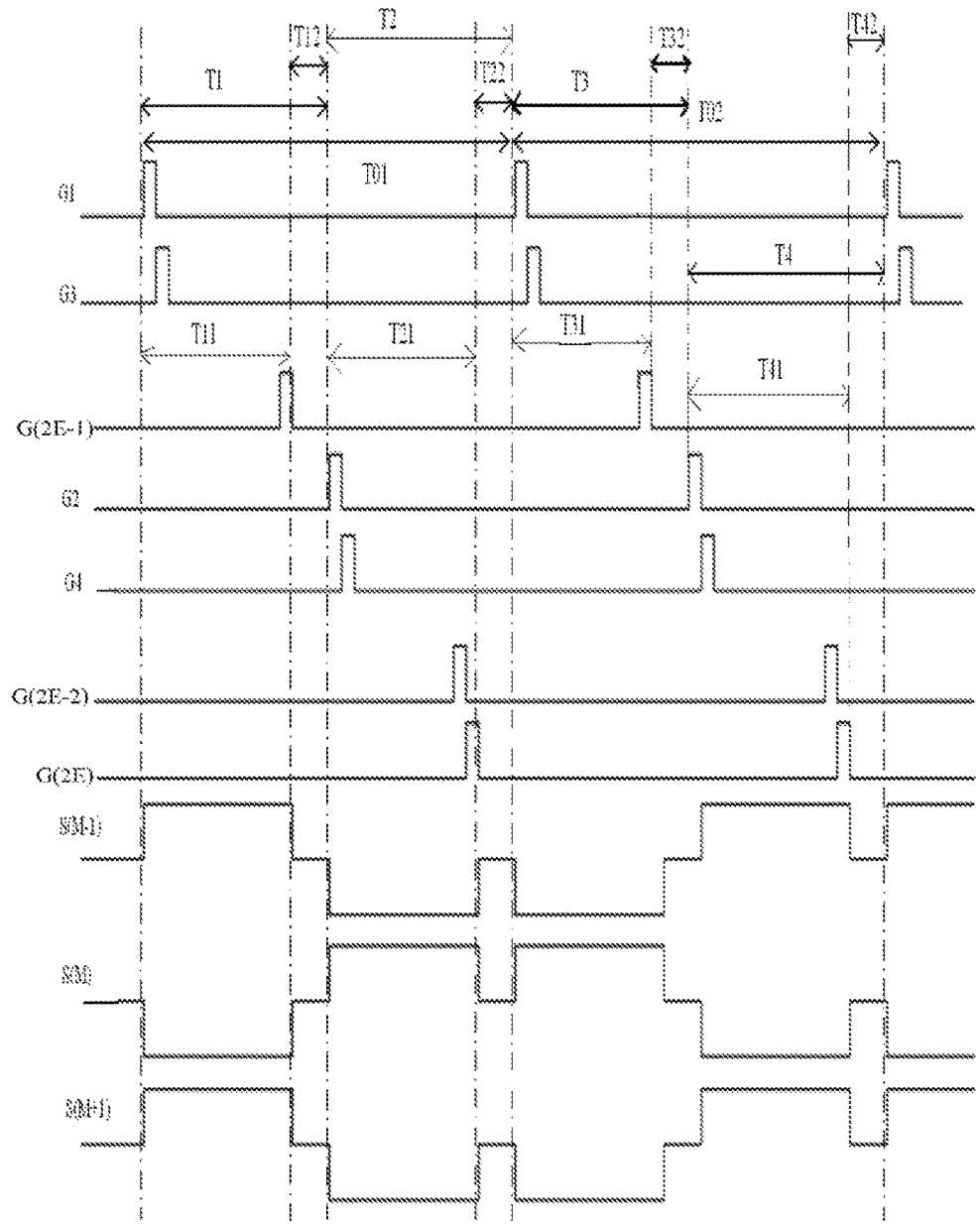
FIG. 4 is another sequence diagram of the method for driving the touch display panel by the driving circuit in FIG. 3 according to at least one embodiment of the present disclosure.

As shown in FIG. 4, in the method for driving the touch display panel by the driving circuit in FIG. 3 according to at least one embodiment of the present disclosure, a time period T01 for displaying a first image frame by the touch display panel is divided into a first control time period T1 and a second control time period T2, and a time period T02 for displaying a second image frame by the touch display panel is divided into a third control time period T3 and a fourth control time period T4.

In FIG. 4, a time period for displaying each image frame of the touch display panel is divided into two control time periods, and the reference sign G4 represents a driving signal applied to a fourth gate line. The first control time period T1 includes a first display time period T11 and a first touch time period T12, and the second control time period T2 includes a second display time period T21 and a second touch time period T22. Within the first display time period T11, the gate lines in the odd-numbered rows, i.e., the first gate line G1, the third gate line G3, . . . , and the $(2E-1)^{th}$ gate line G(2E−1), are sequentially scanned. Within the second display time period T21, the gate lines in the even-numbered rows, i.e., the second gate line G2, the fourth gate line G4, . . . , the $(2E-2)^{th}$ gate line G(2E−2) and the $(2E)^{th}$ gate line G(2E), are sequentially scanned.

The third control time period T3 includes a third display time period T31 and a third touch time period T32, and the fourth control time period T4 includes a fourth display time period T41 and a fourth touch time period T42. Within the third display time period T31, the gate lines in the odd-numbered rows, i.e., the first gate line G1, the third gate line G3, . . . , and the $(2E-1)^{th}$ gate line G(2E−1), are sequentially scanned. Within the fourth display time period T41, the gate lines in the even-numbered rows, i.e., the second gate line G2, the fourth gate line G4, . . . , the $(2E-2)^{th}$ gate line G(2E−2) and the $(2E)^{th}$ gate line G(2E), are sequentially scanned.

In the time period for displaying each image frame by the touch display panel, the data voltages applied to each data line within the first display time period and the second display time period have polarities opposite to each other, the polarities of the data voltages applied to the data lines are not changed within an identical display time period, the data voltages applied to each data line within the display time periods for the adjacent image frames have polarities opposite to each other, and the data voltages applied to the adjacent two data lines within an identical display time period have polarities opposite to each other.

In other words, as shown in FIG. 4, within the time period T11, the data voltage applied to the S(M−1) is positive, and within the time period T21, the data voltage applied to S(M−1) is negative. Within the time period T11, the data voltage applied to S(M) is negative, and within the time period T21, the data voltage applied to S(M) is positive. Within the time period T11, the data voltage applied to S(M+1) is positive, and within the time period T21, the data voltage applied to S(M+1) is negative. Within the time period T31, the data voltage applied to S(M−1) is negative, and within the time period T41, the data voltage applied to S(M−1) is positive. Within the time period T31, the data voltage applied to S(M) is positive, and within the time period T41, the data voltage applied to S(M) is negative. Within the time period T31, the data voltage applied to S(M+1) is negative, and within the time period T41, the data voltage applied to S(M+1) is positive.

Figure 5A:
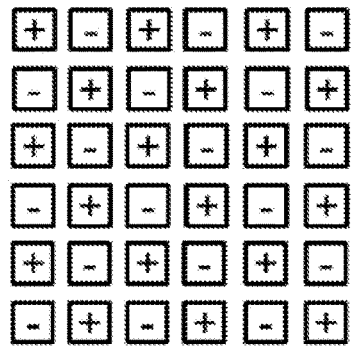
FIG. 5A is a schematic view showing polarities of pixel units in FIG. 3 at an initial stage of T11.
Figure 5B:
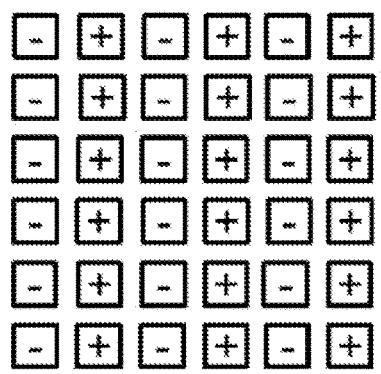
FIG. 5B is a schematic view showing the polarities of the pixel units in FIG. 3 at an initial stage of T21.

At an initial stage of the time period T11 (i.e., an initial stage of the time period T01 for displaying the first image frame by the touch display panel), the polarities of the pixel units in FIG. 3 are shown in FIG. 5A. At an initial stage of the time period T21, the polarities of the pixel units in FIG. 3 are shown in FIG. 5B, i.e., the polarities of the data voltages in the odd-numbered rows in FIG. 5B are opposite to those in FIG. 5A respectively. At an initial stage of the time period T31 (i.e., an initial stage of the time period T02 for displaying the second image frame by the touch display panel), the polarities of the pixel units in FIG. 3 are shown in FIG. 5C, i.e., the polarities of the data voltages in the even-numbered rows in FIG. 5C are opposite to those in FIG. 5B respectively.

Figure 5C:
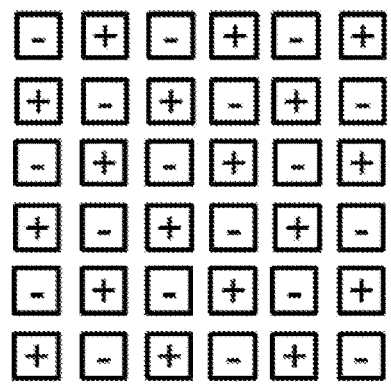
FIG. 5C is a schematic view showing the polarities of the pixel units in FIG. 3 at an initial stage of T31.

Within one image frame, the polarities of all the pixel units as shown in FIG. 5A are inverted as shown in FIG. 5C, so it is able to achieve the display effect of the dot inversion mode. In addition, within the time period for displaying one image frame, it is merely required to change the polarity of the data voltage applied to each data line once, so it is able to remarkably reduce the power consumption as compared with the dot inversion mode.

The present disclosure further provides in some embodiments a device for driving a touch display panel. The touch display panel includes L gate lines and M touch scanning lines, where L and M are each a positive integer greater than 1. The device includes: a clock unit configured to divide a time period for displaying each image frame by the touch display panel into N control time periods, wherein each of the N control time periods includes a display time period and a touch time period, N is an even number equal to or greater than 2; a display control unit configured to drive the L gate lines within the N display time periods in the time period for displaying each image frame by the touch display panel; and a touch control unit configured to drive the M touch scanning lines within each touch time period in the time period for displaying each image frame by the touch display panel.

According to the device for driving the touch display panel in the at least one embodiment of the present disclosure, the time period for displaying each image frame includes N touch time periods, and all the touch scanning lines are driven in each of the touch time periods. As a result, it is able to increase the report rate and the sensitivity, thereby to improve the performance of the touch display panel.

In an alternative embodiment of the present disclosure, the display control unit is further configured to drive the odd-numbered gate lines sequentially within the odd-numbered display time periods and drive the even-numbered gate lines sequentially within the even-numbered display time periods, or drive the even-numbered gate lines sequentially within the odd-numbered display time periods and drive the odd-numbered gate lines sequentially within the even-numbered display time periods. In the time period for displaying each image frame by the touch display panel, a data voltage applied to each data line within each odd-numbered display time period has a polarity opposite to a polarity of a data voltage applied to the data line within each even-numbered display time period.

In this way, the polarities of the data voltages applied to pixels in two adjacent rows may be opposite to each other by merely changing the polarities of the data voltages applied to the data lines once within every two display time periods.

Alternatively, the display control unit is configured to drive the odd-numbered gate lines sequentially within the odd-numbered display time periods and drive the even-numbered gate lines sequentially within the even-numbered display time periods, or drive the even-numbered gate lines sequentially within the odd-numbered display time periods and drive the odd-numbered gate lines sequentially within the even-numbered display time periods. In the time period for displaying each image frame by the touch display panel, a data voltage applied to each data line within each odd-numbered display time period has a polarity opposite to a polarity of a data voltage applied to the data line within each even-numbered display time period. The data voltages applied to each data line within the display time periods for the adjacent image frames have polarities opposite to each other.

In this way, it is able to provide an inversion driving mode between a dot inversion mode and a column inversion mode, so as to achieve a display effect of the dot inversion mode within every two control time periods and reduce the times for inverting the polarities of the data voltages applied to the data lines. In other words, it is able to achieve the display effect of the dot inversion mode by merely changing the polarities of the data voltages applied to the data lines once within two display time periods.

Alternatively, N is equal to 2, and the display control unit is configured to drive the gate lines in odd-numbered rows sequentially within the first display time period and drive the gate lines in even-numbered rows sequentially within the second display time period, or drive the gate lines in the even-numbered rows sequentially within the first display time period and drive the gate lines in the odd-numbered rows sequentially within the second display time period. In the time period for displaying each image frame by the touch display panel, the polarity of the data voltage applied to each data line within the first display time period is opposite to the polarity of the data voltage applied to the data line within the second display time period. The polarities of the data voltages applied to the data lines are not changed within an identical display time period, the data voltages applied to each data line within the display time periods for the adjacent image frames have polarities opposite to each other, and the data voltages applied to the two adjacent data lines within an identical display time period have polarities opposite to each other.

In this way, it is able to provide an inversion driving mode between a dot inversion mode and a column inversion mode, so as to achieve a display effect of the dot inversion mode every one image frame and reduce the times for inverting the polarities of the data voltages applied to the data lines. In other words, it is able to achieve the display effect of the dot inversion mode by merely changing the polarities of the data voltages applied to the data lines once within one image frame.

The present disclosure further provides in some embodiments a touch display device including a touch display panel and the above-mentioned device for driving the touch display panel.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A method for driving a touch display panel, wherein the touch display panel comprises L gate lines and M touch scanning lines, L and M are each a positive integer greater than 1, the method comprising steps of:

dividing a time period for displaying each image frame of the touch display panel into N control time periods, wherein each of the N control time periods includes a display time period and a touch time period, N is an even number equal to or greater than 2; and driving the L gate lines within the N display time periods and driving the M touch scanning lines in each of the N touch time periods in the time period for displaying each image frame of the touch display panel, wherein the step of driving the L gate lines within the N display time periods comprises:

driving the odd-numbered gate lines sequentially in the odd-numbered display time periods and driving the even-numbered gate lines sequentially in the even-numbered display time periods, or driving the even-numbered gate lines sequentially in the odd-numbered display time periods and driving the odd-numbered gate lines sequentially in the even-numbered display time periods; and in the time period for displaying each image frame of the touch display panel, a data voltage applied to each data line within each odd-numbered display time period has a first polarity and remains unchanged during the odd-numbered display time period, a data voltage applied to the data line within each even-numbered display time period has a second polarity and remains unchanged during the even-numbered display time period, the data voltage applied to each data line within in each of the N touch time periods is zero and remains unchanged during the touch time period, the first polarity is opposite to the second polarity, one of the first polarity and the second polarity is above zero, and the other of the first polarity and the second polarity is below zero.

2. The method according to claim 1, wherein the data voltages applied to each data line within the display time periods for the adjacent image frames have polarities opposite to each other.

3. The method according to claim 2, wherein N is equal to 2.

4. The method according to claim 2, wherein the polarities of the data voltages applied to the data lines are not changed within an identical display time period, and the data voltages applied to the adjacent data lines within the identical display time period have polarities opposite to each other.

5. The method according to claim 1, wherein N is equal to 2.

6. A device for driving a touch display panel, wherein the touch display panel comprises L gate lines and M touch scanning lines, L and M are each a positive integer greater than 1, the device comprising:

a clock unit configured to divide a time period for displaying each image frame of the touch display panel into N control time periods, wherein each of the N control time periods includes a display time period and a touch time period, N is an even number equal to or greater than 2;

a display control circuit configured to, in the time period for displaying each image frame of the touch display panel, drive the L gate lines within the N display time periods; and a touch control circuit configured to, in the time period for displaying each image frame of the touch display panel, drive the M touch scanning lines within each of the N touch time periods, wherein the display control circuit is further configured to, in the time period for displaying each image frame of the touch display panel, drive the odd-numbered gate lines sequentially within the odd-numbered display time periods and drive the even-numbered gate lines sequentially within the even-numbered display time periods, or drive the even-numbered gate lines sequentially within the odd-numbered display time periods and drive the odd-numbered gate lines sequentially within the even-numbered display time periods, and wherein, in the time period for displaying each image frame of the touch display panel, a data voltage applied to each data line within each odd-numbered display time period has a first polarity and remains unchanged during the odd-numbered display time period, a data voltage applied to the data line within each even-numbered display time period has a second polarity and remains unchanged during the even-numbered display time period, the data voltage applied to each data line within in each of the N touch time periods is zero and remains unchanged during the touch time period, the first polarity is opposite to the second polarity, one of the first polarity and the second polarity is above zero, and the other of the first polarity and the second polarity is below zero.

7. The device according to claim 6, wherein the data voltages applied to each data line within the display time periods for the adjacent image frames have polarities opposite to each other.

8. The device according to claim 7, wherein N is equal to 2.

9. The device according to claim 7, wherein the polarities of the data voltages applied to the data lines are not changed within an identical display time period, and the data voltages applied to the adjacent data lines within the identical display time period have polarities opposite to each other.

10. The device according to claim 6, wherein N is equal to 2.

11. A touch display device, comprising a touch display panel and the device for driving the touch display panel according to claim 6.

12. The touch display device according to claim 11, wherein the data voltages applied to each data line within the display time periods for the adjacent image frames have polarities opposite to each other.

13. The touch display device according to claim 12, wherein N is equal to 2.

14. The touch display device according to claim 12, wherein the polarities of the data voltages applied to the data lines are not changed within an identical display time period, and the data voltages applied to the adjacent data lines within the identical display time period have polarities opposite to each other.

15. The touch display device according to claim 11, wherein N is equal to 2.

* * * * *